(12) United States Patent
Kumar et al.

(10) Patent No.: US 9,740,974 B2
(45) Date of Patent: Aug. 22, 2017

(54) RETRIEVING DATA EMBEDDED INTO THE SURFACE OF A 3D PRINTED OBJECT

(71) Applicant: Adobe Systems Incorporated, San Jose, CA (US)

(72) Inventors: Abhishek Kumar, New Delhi (IN); Naveen Prakash Goel, Noida (IN); Mayur Hemani, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/192,624

(22) Filed: Jun. 24, 2016

(65) Prior Publication Data
US 2016/0307083 A1   Oct. 20, 2016

Related U.S. Application Data

(62) Division of application No. 14/183,004, filed on Feb. 18, 2014, now Pat. No. 9,400,910.

(51) Int. Cl.
| | |
|---|---|
| *G06K 19/06* | (2006.01) |
| *G06K 7/14* | (2006.01) |
| *G06K 1/12* | (2006.01) |
| *B29C 67/00* | (2017.01) |
| *B33Y 10/00* | (2015.01) |
| *B33Y 50/00* | (2015.01) |

(Continued)

(52) U.S. Cl.
CPC .... *G06K 19/06037* (2013.01); *B29C 67/0051* (2013.01); *B29C 67/0088* (2013.01); *B33Y 10/00* (2014.12); *B33Y 50/00* (2014.12); *B33Y 50/02* (2014.12); *B33Y 99/00* (2014.12); *G05B 19/4099* (2013.01); *G06K 1/121* (2013.01); *G06K 7/1426* (2013.01); *G06K 19/06159* (2013.01); *G05B 2219/49023* (2013.01)

(58) Field of Classification Search
CPC .......... B33Y 50/00; B33Y 80/00; G06K 7/10; G06K 7/10544; G06K 9/00201
USPC ................................. 235/487, 494, 375, 454
See application file for complete search history.

(56) References Cited

U.S. PATENT DOCUMENTS

| | | |
|---|---|---|
| 5,825,933 A | 10/1998 | Hecht |
| 7,611,058 B2 | 11/2009 | Culp et al. |

(Continued)

FOREIGN PATENT DOCUMENTS

WO   WO 2010/032243   3/2010

OTHER PUBLICATIONS

Karl D.D. Willis et al., "InfraStructs: Fabricating Information Inside Physical Objects for Imaging in the Terahertz Region", ACM Transactions on Graphics, vol. 32, No. 4, Article 138, Jul. 2013, 10 pgs.

(Continued)

*Primary Examiner* — Paultep Savusdiphol
(74) *Attorney, Agent, or Firm* — Keller Jolley Preece (57) ABSTRACT

A computer implemented method and apparatus for storing and retrieving data embedded into the surface of a 3D printed object is described. The method and apparatus develops an electronic file used for printing a 3D object which embeds as structure into the 3D object, a 3D symbol matrix representative of data to be printed concurrently with the 3D object, such as a 3D barcode. A selected symbology is used for making the symbol matrix in accordance with the type of printing process to be used to print the 3D object.

20 Claims, 6 Drawing Sheets

(51) Int. Cl.
*B33Y 99/00* (2015.01)
*G05B 19/4099* (2006.01)
*B33Y 50/02* (2015.01)

(56) References Cited

U.S. PATENT DOCUMENTS

| | | |
|---|---|---|
| 8,297,510 B1 | 10/2012 | Yakshtes et al. |
| 8,503,791 B2 | 8/2013 | Conwell |
| 8,837,672 B2 | 9/2014 | Nance et al. |
| 9,056,422 B2 * | 6/2015 | Rich .......................... G06T 9/00 |
| 2007/0164113 A1 | 7/2007 | Culp et al. |
| 2010/0051693 A1 * | 3/2010 | Dubina ................. H04N 19/94 |
| | | 235/454 |
| 2010/0055423 A1 | 3/2010 | Chretien et al. |
| 2012/0181329 A1 | 7/2012 | Gratton et al. |
| 2012/0234905 A1 * | 9/2012 | Lau .......................... G06K 1/20 |
| | | 235/375 |
| 2013/0073073 A1 | 3/2013 | Pettis |
| 2013/0206833 A1 | 8/2013 | Kugel |
| 2013/0294579 A1 | 11/2013 | Nance et al. |
| 2014/0074274 A1 | 3/2014 | Douglas et al. |
| 2014/0121813 A1 | 5/2014 | Schmehl |
| 2014/0240735 A1 | 8/2014 | Salgado |
| 2014/0240740 A1 | 8/2014 | Salgado |
| 2014/0263667 A1 | 9/2014 | Mege |
| 2014/0263674 A1 | 9/2014 | Cerveny |
| 2014/0271964 A1 | 9/2014 | Roberts et al. |
| 2014/0301179 A1 * | 10/2014 | Rich .......................... G06T 9/00 |
| | | 369/275.4 |
| 2014/0371895 A1 | 12/2014 | Sadusk et al. |
| 2015/0235069 A1 | 8/2015 | Kumar et al. |
| 2015/0379314 A1 * | 12/2015 | Schreiber ................ G01S 13/89 |
| | | 235/439 |

OTHER PUBLICATIONS

Winnie Wing-Yi Chan, "A Survey on Multivariate Data Visualization", Department of Computer Science and Engineering, Hong Kong University of Science and Technology, Clear Water Bay, Kowloon, Hong Kong, Jun. 2006, 29 pgs.

David L. Hecht, "Printed Embedded Data Graphical User Interfaces", IEEE, Mar. 2001, pp. 47-55.

Thomas Dean et al., "Quick Layered Response (QLR) Codes", Department of Electrical Engineering, Stanford University, Stanford, CA, 6 pgs.

U.S. Appl. No. 14/183,004, mail date Feb. 3, 2016, Preinterview 1st Office Action.

U.S. Appl. No. 14/183,004, mail date Mar. 28, 2016, Notice of Allowance.

* cited by examiner

RETRIEVING DATA EMBEDDED INTO THE SURFACE OF A 3D PRINTED OBJECT

CROSS REFERENCE TO RELATED APPLICATIONS

The present application is a division of U.S. application Ser. No. 14/183,004, filed Feb. 18, 2014. The entire contents of the foregoing application are hereby incorporated by reference in its entirety.

BACKGROUND OF THE INVENTION

Field of the Invention

This disclosure relates to 3-dimensional (3D) printing of objects and, more particularly, to techniques for storing and retrieving data embedded into the surface of a 3D printed object.

Description of the Related Art

Technology currently available and well known provides for 3-dimensional (3D) printing of physical 3D objects. Such objects can be the shape of any physical creation conceived by man, from something as simple as a geometric shape like a ball or cube to something as complex as a replica of an intricate trestle bridge, a statue by the artist Michelangelo, or a representation of an exotic animal. As is typical of creations that result from human effort, it is desirable to associate information with such creations, such as the name of the entity, person or company that created the object, the name of entity, person or company, that printed the object, a creation date, a name for the object, or any other information that entity would like to have associated with the 3D object. It is typically desired that such information be as permanently associated with the object as possible. One way humans convey information is by writing. Written information communicates facts (also called data) that are acquired at a given point in time and then conveyed to others by an arrangement of symbols. Symbols can include, for example, numeric characters such as 1, 2, 3, . . . etc., alphabetic characters such as A, B, C . . . etc., which examples are representative of Arabic numerals and Latin letters. Many other kinds of letters and numeric characters are also known and used that are based on different languages, such as Chinese, to name just one other language.

One technique used to associate written information so that it is presented in combination with a physical object, is to convey the information by use of a label having written characters printed thereon. One type of label designed to function particularly well in a digital environment is a barcode. A barcode is a type of label which is easy for a machine to create and simple for a machine to reliably read. A barcode, like any other label, is an arrangement of symbols that conveys information, such as an identification, to be associated with a physical object. Although the identification of an object can be conveyed by a lengthy description of the object, which will require the use of many symbols, a barcode may be a unique and predefined arrangement of symbols that can be used to convey the identification information with less symbols. Originally, barcodes used spaced parallel lines as symbols, which systematically represent data by varying the widths and spacings of the parallel line symbols. Such barcodes are referred to as linear or one-dimensional (1D) since their varying widths and spacings can be detected by moving an edge detector in a single direction (i.e., 1D) so as to traverse the parallel lines. In the last decade 1D barcodes have evolved into rectangles, dots, hexagons and other geometric patterns arranged in two dimensions (2D). By having two dimensions to present data, more data can be conveyed with a 2D barcode as compared with a 1D barcode. For example, one kind of object identification information that can be in a barcode is called a stock-keeping unit (SKU) number. An SKU number is a unique identifier that is assigned by a business for each distinct product that can be purchased from that business, such as SKU#123456789. Thus, detailed identification information for a physical object can be compactly conveyed by merely providing a barcode that has the SKU number for that physical object.

In order that the barcode identification information (such as an SKU number or other arrangement of information conveying symbols) does not become separated from the physical object, barcodes are typically printed on a label and then attached to the physical object, such as by glue or other adhesive.

Other types of information can be included in a barcode, such as an Expiration date, an Owner, a Universal Resource Locator (URL), a Batch number, a Watermark, a Production date, a Package date, a Serial number, a Weight (kgs/pounds), a Price, a Universal Product Code (UPC), a Revision Number, a Phone Number, or any other information imaginable. The only limit on the amount of information that can be conveyed by a barcode type label is the amount of space on the label in which to write the symbols used to convey the information. Since the size of the label is limited by the size of the product on which it is to be placed, it is always desirable to find a way to improve the amount of information that a label of a limited size, such as a barcode, can carry. Currently one dimensional (1D) and two dimensional (2D) barcodes are ubiquitous elements in modern manufacturing processes and products. Barcodes based on Universal Product Code (UPC) and the "GS1" standards are numeric data used to identify products and allow businesses to track their products from creation to sale.

Most current 1D and 2D barcodes are limited to printing 2D representations directly on an object or on a label and then adhering the label to a surface of the object. Sometimes the 2D representations can be micro-etched on hard surfaces of the object. As previously noted, 2D barcodes provide more information as compared with a 1D barcode because two dimensions of the label are available for writing the symbols that convey the data as compared with one dimension. However, even when 2D surface barcodes are used, the amount of data that can be conveyed is limited by the 2D area of the surface used on which the symbols are written. Additionally, the durability of the data presented by a 2D barcode is low because a surface presentation, such as a label, can be easily damaged (for example by the action of a liquid, such as water, degrading the ink used to print the barcode, or by water degrading the adhesive used to affix the barcode to the surface of the object). Even a 2D barcode presentation that is etched into the surface of an object can be damaged to the point of being partially obscured by being worn away by repeated handling of the object or by exposure of the object to the forces of nature over time. Even furthermore, cryptology and steganography techniques for providing robust data security are unnecessarily limited when using 2D barcodes, since they are limited to techniques that only use two dimensions.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method and apparatus for storing and retrieving data embedded in the surface of a 3D printed object is described. The method and apparatus develops an electronic file used for printing a 3D object which embeds a 3D symbol matrix as part of the surface structure of the 3D object. The 3D symbol matrix is representative of data, and is printed concurrently with printing of the 3D object. In some embodiments, a selected symbology is used for making the symbol matrix. The symbology used is selected so as to optimize accurate symbol printing, by matching the symbology with the accuracy level achievable by the type of printing process used to print the 3D object.

A method and apparatus to retrieve data embedded in the surface structure of a 3D object, where a 2D image of data embedded in the surface structure of the 3D object is processed to:
 a) identify an orientation and dimension of a bounded area of the 3D object that includes the data,
 b) identify sub-regions of the area, and
 c) detect symbols in the sub-regions of the area so as to retrieve the data.

A printed 3D object comprising a surface having embedded therein during printing, a volume corresponding to a 3D symbol matrix representative of data.

While the method and apparatus is described herein by way of example for several embodiments and illustrative drawings, those skilled in the art will recognize that the method and apparatus for storing and retrieving data embedded in the surface structure of a 3D printed object is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for storing and retrieving data embedded in the surface structure of a 3D printed object defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As previously explained, existing barcode solutions provide 2D representations on surfaces of objects as barcodes. However, when 2D surface barcodes are used, the amount of data that can be conveyed is limited by the 2D area of the barcode used to form the symbols. Additionally, the durability of their data presentation is low because associating the data of a barcode to an object by use of a surface label can be easily damaged (for example by water degrading ink used to print the barcode or by water degrading the adhesive used to affix the barcode to the surface of the product) or the printed barcode may worn away over time. Even furthermore, cryptology and steganography techniques for providing robust data security are unnecessarily limited, since they are limited to techniques that only use two dimensions.

Thus, and in accordance with embodiments of the present invention, techniques are provided herein for the creation, association, and retrieval of data that: (1) facilitates data presentation in a 3D manner that is improved as compared with data presentation in a 2D manner, (2) a durability of data presentation that is improved as compared with a surface label (either printed or surface etched) for data presentation and (3) a data presentation having data security that is improved as compared with the data security that is possible with 2D data presentation. For example, if the data to be associated with a 3D object and conveyed by writing is a barcode such as SKU#123456 (although any other type of data imaginable by man is possible to be conveyed, and barcode data is only one example of billions of possibilities of data that can be conveyed by writing), instead of providing a 2D barcode on the surface of the 3D object to convey data, embodiments of the invention provide a 3D barcode that is embedded into the surface structure of the 3D object. The embodiments provide that the 3D barcode includes symbols representative of data, which symbols become embedded into a volume of the 3D object that extends into the 3D object from an outside surface thereof, by modifying the printing process of the 3D object to include printing of the symbols that comprise the information conveyed by the 3D barcode. That is, the modification of the 3D printing process causes the symbols of the 3D barcode to structurally become part of a volume of the 3D object during printing of the 3D object. Thus, the 3D barcode becomes formed from the same material and at the same time as the 3D object is formed by printing. By embedding the 3D barcode symbols into a volume of the 3D object that extends into the surface of the 3D object, the durability of the barcode information is greatly enhanced as compared with a printed paper label that is merely adhered to the surface of the 3D object or a surface etching of a 2D barcode onto a surface of the 3D object. Also, by use of a volume in which to form the symbols, a higher density of data can be presented by use of the third dimension in which to include the symbols. Even furthermore, data security (using either of cryptographic or steganographic techniques) is substantially improved as compared with 2D techniques, since when a third dimension is available for cryptographic or steganographic techniques, more complex and therefore successful techniques can be implemented.

Embodiments of the present invention include techniques for storing and retrieving data embedded in the surface structure of a 3D printed object. The embodiments develop an electronic file used for printing a 3D object that will store the data by embedding it into a volume of a 3D object from an outside surface thereof, during printing of the 3D object. The data is structured as a matrix of 3D symbols (such as an arrangement of objects having a simple geometric shape) which symbols are representative of the data to be printed concurrently with the 3D object.

In some embodiments, the symbology used for making the symbol matrix is selected in order to optimize accurate symbol printing by matching the symbology with the accuracy level achievable by the type of printing process used to print the 3D object. For example, a Fused Deposition Model (FDM) type printer is particularly suitable to accurately print an arrangement of parallel lines, while a Selective Laser Sintering (SLS) type printer is more suitable to accurately print an arrangement of solid geometric shapes. The symbology used to represent the data and the structure of the 3D symbol matrix are also selected so as to allow simple image processing techniques to be applied to a 2D image of the 3D symbol matrix, so as to provide an easy and reliable identification of the symbols representative of the embedded data. For example, "edge detection" that is, detection of edges, is a simple and reliable image processing technique where brightness variations from light to dark, or vice versa, are detected in areas of an image. Each brightness variation, and its position in the image, is recorded as an edge. In combination, once all edges and their positions are detected, objects having a simple shape in the image (such as a group of parallel lines or the hypotenuse of a right triangle) are reliably, simply and directly indicated by the pattern of the detected edges. Accordingly, the symbology used in the matrix to convey the data includes simple geometric shapes or lines, so as to allow simple and reliable recovery of the data embedded in the 3D object by the 3D symbol matrix using simple 2D image processing.

As with any symbology used as characters of a language to communicate information, each character of the language has a meaning. In one embodiment each of a plurality of different symbols can be pre-defined by the language to convey a given number. For example, if the symbology included four solid right isosceles triangles, each one orientated so as to be rotated 90 degrees around a central vertical axis from one another, each particular orientation of the four triangles can be used to convey a respective one of four numeric values, such as 0, 1, 2 and 3. Alternatively, if the symbology included four different orientations of rows of parallel ridges, each ridge symbol orientated so that the rows of parallel ridges are rotated 45 degrees with respect to the rows of each other ridge symbol, each particular orientation of the four ridge symbols can be used to convey a respective one of four numeric values, such as 0, 1, 2 and 3 (for rotations of +45 degrees from horizontal, −45 degrees from horizontal, +90 degrees from horizontal, and −90 degrees from horizontal). With such symbols and pre-definition of what they mean (that is, how to decode them so as to convey identification of each symbol to identification of a numeric value that corresponds, via mapping, to a character in a human communicable language), conveyance of information to humans is possible using the symbols.

As noted above, the embodiments described herein make use of the third dimension of a 3D volume as compared with using only a 2D area, to include data with a 3D object in a manner that aids steganography, high data storage capacity, durability, and data security (protection from malicious intent). Obtaining the data to be included with the 3D object can come any time before the actual printing of the 3D object. The 3D object may be obtained with the data already included therein, or the 3D object may be obtained separately from the data and then included with the 3D object just before the 3D printing. In general, however, obtaining the data can be done anytime during or after creation of the electronic file representative of the 3D object that is used for printing of the 3D object.

Embodiments of the invention may be realized as a workflow in a 3D printing program, such as PHOTOSHOP 3D™, an image viewing and editing computer software application available from ADOBE® Systems Incorporated. PHOTOSHOP 3D™ allows a direct connection between a users' computer running PHOTOSHOP 3D™ and a 3D Printer (that is, without using any intermediate printing software) for printing 3D objects. Assembling data obtained for association with a 3D object into a 3D barcode for printing simultaneously with the 3D object, can be done within the PHOTOSHOP 3D™ software automatically, when the electronic file representative of the 3D object already includes the data, or manually, by the user merely typing the data on a keyboard during operation of the PHOTOSHOP 3D™ software on the users' computer. In another embodiment, the workflows described herein can be incorporated into 3D printing software that is included with the purchase of a 3D printer, or can be used by a Print Service Provider (PSP) such as Shapeways, which prints 3D objects for users who send their electronic files to them for printing.

Exemplary uses of the invention are: 1) Consumer appliance companies which create 3D prints of various iterations of their products, and in order to not lose track of which model is which, they incorporate the 3D print date, source model ID, revision number, etc. onto the 3D objects, so it will forever be part of the structure of the product; 2) Designers who create 3D objects and make them available for 3D printing to consumers in a 3D printing marketplace, such as at Shapeways, typically want that whenever their model is printed, a URL to their website will also be incorporated into the 3D print of their 3D object. Optionally a backtrack URI (Uniform Resource Identifier) should be included with the 3D object, so as to will allow the designer to uniquely track feedback by the purchasers of each 3D object; 3) Industrial production lines may use 3D printing for producing parts for their final products. As such, it would be desirable if each part included its own ID number, batchCode, Manufacture Date, Ship to Customer details, etc., directly and permanently therein; 4) Companies may create 3D prints of their new products for sharing with close internal partners, but may not want their designs to be disclosed to others, and if such a case happens they would like to be able to backtrack to the source of any unwanted disclosure. Hence as a matter of steganography, ID data added into the 3D print in a manner so that it is not overtly visible in the 3D print. Thus, by use of the present invention, a Partner Identifier can be surreptitiously inserted into their 3D prints.

Embodiments of the invention find use in industrial applications, enterprise applications and with end users. Any workflow where it is desirable that more than a token amount of information be included with a 3D object for the purpose of steganography, data storage capacity, durability or data security.

Various embodiments of techniques for storing and retrieving data embedded in the surface structure of a 3D printed object are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
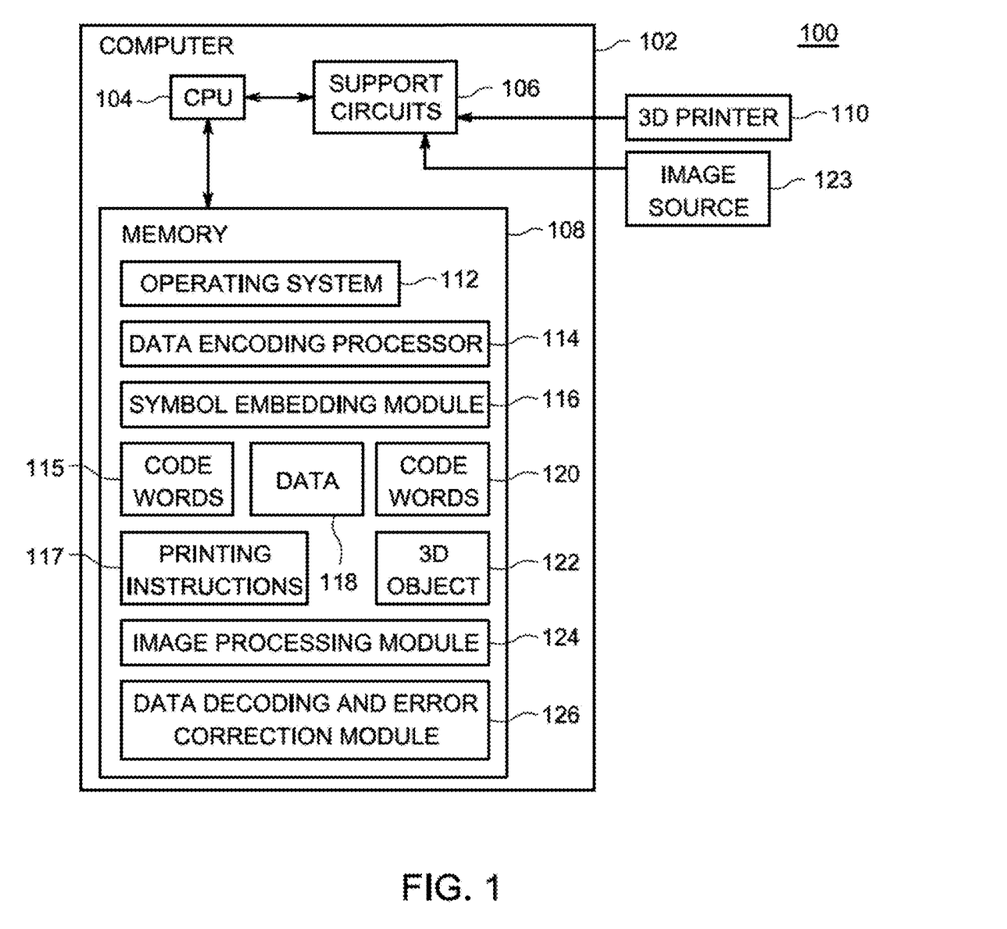
FIG. 1 depicts a block diagram of a system for storing data embedded in the surface structure of a 3D printed object and retrieving data stored in the surface structure of a 3D printed object, according to one or more embodiments.

FIG. 1 is a block diagram of an apparatus 100 for storing data embedded in the surface structure of a 3D printed object and retrieving data stored in the surface structure of a 3D printed object, according to one or more embodiments. The apparatus 100 includes a computer 102. The computer 102 is a computing device, for example a desktop computer, laptop, tablet computer, and the like. The computer 102 includes a Central Processing Unit (CPU) 104, support circuits 106, and a memory 108. The computer 102 may be connected to a 3D printer 110. The CPU 104 may include one or more commercially available microprocessors or microcontrollers that facilitate data processing and storage.

The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 112, a data encoding processor 114, a symbol embedding module 116, data 118 to be encoded into a 3D object 120, a 2D image 122, an image processing module 124 and a data decoding and error correction module 126. It is noted that data 118 is any information that is to be conveyed in association with the 3D object using written symbols, such as characters, letters, numbers, pictographs, etc., or any combination thereof. As well known, characters are grouped by coding (mapping) into what is called "language" so as to convey information, such as accomplished by the alphabetic characters used to convey the English language, and the characters used to convey the Chinese language, to name just two of many possible character codlings used to convey information by language and may include data 118. Thus, data 118 may be "www.google.com". Other groupings of characters used to convey information are numeric based languages, such as ASCI, Binary, Hexadecimal, etc., which upon application of a pre-defined mapping, is converted into non-numeric language, such as English. Thus, data 118 may be a combination of letters and numbers, such as "SKU#12345". The characters used to form language and convey information, and particularly numeric characters, may also be easily encoded, that is re-mapped in accordance with a pre-defined mapping, so as to increase the amount of information conveyed, or to increase the ability of the data to be completely understood when parts of the data are unrecoverable or erroneously recovered due to errors, or to obscure the presentation of the underlying data. In some embodiments described herein the data 118 is encoded for all three of the above-noted reasons, as will be described below.

The 3D object 120 is an electronic file representative of a 3D object to be printed, such as a conventional .STL file. The 2D image 122 is provided by an image source 123. Image source 123 is any digital imaging device that is readily available to someone who may have a 3D printed object in their presence and who is willing to take an image of the 3D object so as to recover the data 118. Image source 123 need merely provide a digital image of conventional photographic quality of a portion of the surface of the 3D object which includes data 118 printed therein. As such, image source 123 may be a camera of a cell phone, not specifically shown. Of course, if a person in the presence of the 3D object has a stand-alone digital camera, that cameral could also be used to supply an image of the 3D object. The operating system 112 may include various commercially known operating systems.

The data encoding processor 114 accesses the data 118 to be stored in the 3D object 120. As noted above, the data 118 may have been included with the electronic file representative of the 3D object 120, or may have been provided for association with the 3D object after creation of the 3D object, by manual input to memory 108 by the user of computer 102. The data encoding processor 114 then converts the data 118 to coded data, that is, code words 115 representative of the data 118. As described above, converting data into coded data provides advantages, such as the ability to increase the amount of information conveyed by the data, increasing the recovery of the data in view of errors, etc. In order to further increase the durability and reliability of correct recovery of the code words 115 that are to be embedded in the 3D object 120, forward error correction coding is optionally employed as part of the coding process. One suitable known forward error correction coding technique is the well-known and widely used Reed-Solomon Error Correction Code (RS-ECC) technique, described in greater detail with respect to the method 200 below. The code words 115 are then applied to the symbol embedding module 116. In accordance with embodiments of the invention, symbol embedding module 116 operates differently depending upon which printing technology is to be used to print the 3D object 120. If a linear extrusion/tracing type of printing process is to be used, such as by a Fused Deposition Model (FDM) printer, the symbol embedding module 116 operates in accordance with method 300 of FIG. 3. If a grid-based layered area type of printing process is to be used to print the 3D object 120, such as by Digital Light Projection (DLP), Powder Deposition Printing (PDP), Jetting Liquid Polymer (JLP), Selective Laser Sintering (SLS) or Stereolithography (SLA) printer, the symbol embedding module 116 operates in accordance with method 400 of FIG. 4. The output of the symbol embedding module 116 is a set of printing instructions 117 (an electronic file) adapted to a particular printing technology for modifying the printing of 3D object 120. When the set of printing instructions 117 is applied to a printer 110 of the appropriate technology, it causes the printer to print the 3D object 120 in a manner so as to have the data 118 embedded into a surface area of the 3D object as symbols that form part of the structure of the 3D object.

Figure 7:
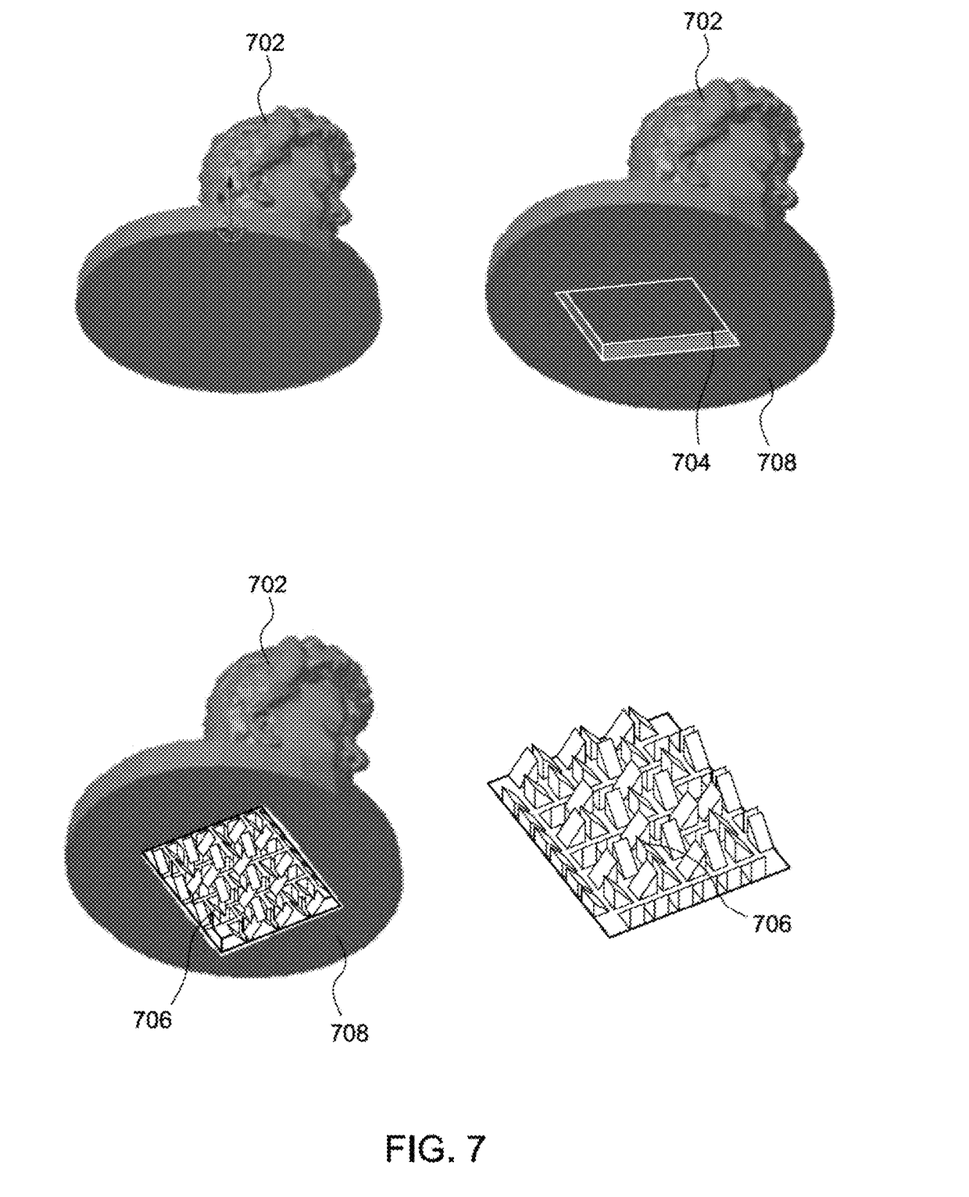
FIG. 7 depicts embedding a symbol matrix in a 3D object as performed by the method of FIG. 4, according to one or more embodiments.

The end result when using a grid-based area type of printing process is a 3D object such as 702 of FIG. 7, having a data matrix 706 embedded as structure in a surface area thereof, such as an area on a bottom surface 708. The embodiments rely on the reflective properties of differently shaped symbols formed by the material in the embedded data matrix 706 to recover the data 118.

For recovery of the data embedded into a surface area of the 3D object, the illustrated embodiment includes use of the image processing module 124 and the data decoding and error correction module 126. The 2D image 122 (embodied as an electronic file, such as a JPEG) generated by the image source 123, is provided by support circuits 106 to the image processing module 124. The image 122 is processed by the image processing module 124 using conventional edge detection techniques well known to those of ordinary skill in the art, so as to detect patterns in light reflected from the symbols embedded as structure into the surface area of the 3D object. Initially, the image 122 is processed by image processing module 124 so as to identify the area of the surface where the data is embedded into the 3D object. This is accomplished relatively easily by the use of a predefined pattern of the embedded symbols that is arranged to define the bounds and orientation of the area which includes the data. Image processing module 124 uses edge detection techniques to detect patterns in light reflected from the symbols, as described below in conjunction with FIG. 5. Additionally, another predefined pattern of the embedded symbols is used to identify and define a grid pattern within the identified area in which the symbols representative of the data are located. Additional details concerning defining and identifying the data matrix and the symbols included therein are also described below in conjunction with FIGS. 6 and 7. Once the grid pattern in the area where the data is located is identified, image processing module 124 processes the image 122 in the identified grid pattern to identify the symbols representative of the data. The identified symbols are then processed by the data decoding and error correction module 126, which operates in a well know manner inversely to the above-described Reed-Solomon Error Correction Coding technique used by the data encoding processor 114, for recovering the error correction codes and then decoding them so as to recover the original data.

The above described operations can be realized as a workflow operating in a 3D printing program, such as PHOTOSHOP 3D™, an image viewing and editing computer software application available from ADOBE® Systems Incorporated, which program can be installed in memory 108. PHOTOSHOP 3D™ allows a direct connection between a users' computer running PHOTOSHOP 3D™ and a 3D Printer (that is, between computer 102 and printer 110) without using any intermediate printing software, for printing 3D objects. Assembling data obtained for association with a 3D object into a 3D barcode for printing simultaneously with the 3D object, can be done within the PHOTOSHOP 3D™ software automatically, if the electronic file representative of the 3D object already includes the data, or manually if the data is not included with the electronic file, by the user merely typing the data on a keyboard (not shown) during operation of the PHOTOSHOP 3D™ software on the users' computer 102. In another embodiment, the workflows described herein can be incorporated into 3D printing software that is included with the purchase of a 3D printer, or can be used by a Print Service Provider (PSP) such as Shapeways, which prints 3D objects for users who send their electronic files to them for printing.

Although in FIG. 1 the data recovery modules, namely the image processing module 124 and the data decoding and error correction module 126, are illustrated as part of computer 102, in other embodiments, data recovery can be accomplished just as easily at another location, using a processor in a computer other than computer 102.

Figure 2:
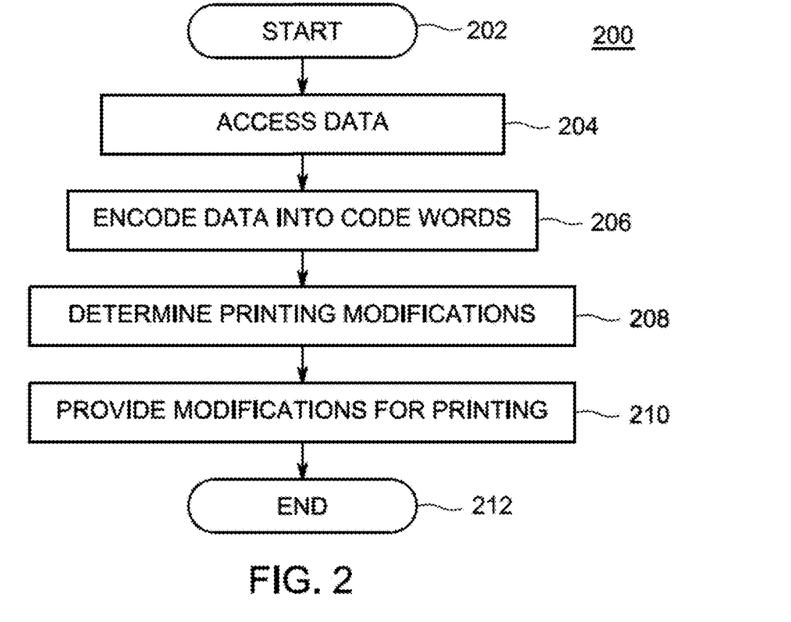
FIG. 2 depicts a flow diagram of a method for storing data embedded in the surface structure of a 3D printed object as performed by the data encoding processor and symbol embedding module of FIG. 1, according to one or more embodiments.
Figure 6A:
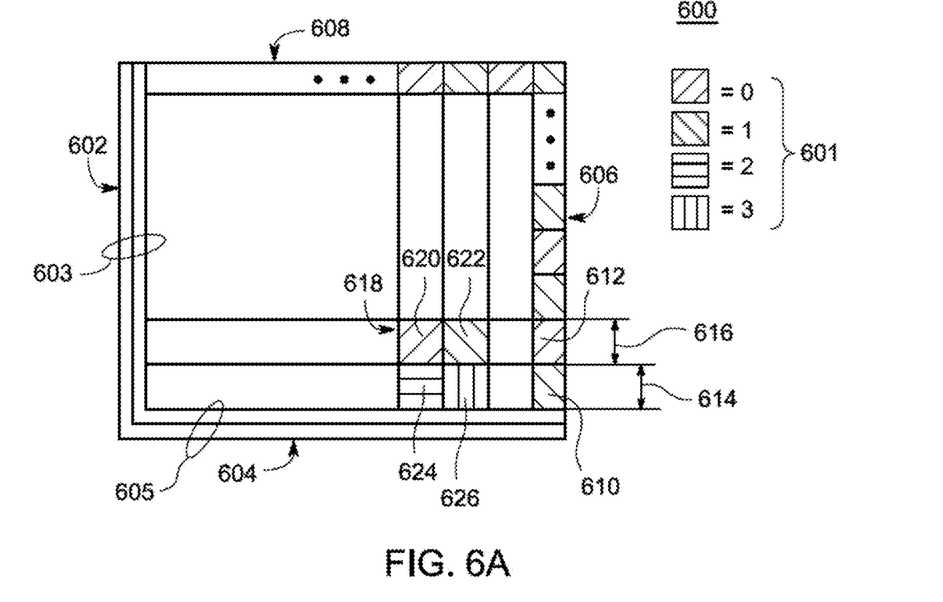
FIGS. 6A and 6B together depict construction of a symbol matrix as performed by the symbol embedding module of FIG. 1, according to one or more embodiments.
Figure 6B:
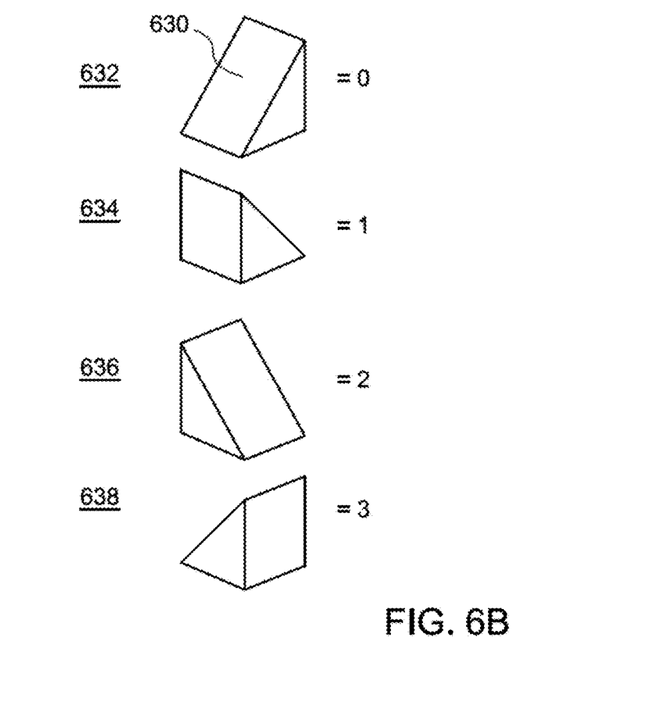

FIG. 2 depicts a flow diagram of a method 200 for storing data as symbols embedded into the surface of a 3D printed object as performed by the data encoding processor 114 and symbol embedding module 116 of FIG. 1, according to one or more embodiments. The method 200 encodes the data into symbols that are adapted to a particular printing technology to be used to print the 3D object. The method 200 then develops a set of instructions, that is, and electronic file, for printing the 3D object so that the data becomes stored as a matrix of symbols (such as symbols 620-626 of the matrix 600 depicted in FIG. 6A or symbols 632-638 of the matrix 706 depicted in FIGS. 6B and 7) embedded into the surface structure of the 3D object upon printing. Method 300 of FIG. 3 uses a symbology such as shown in FIG. 6A, which is optimized to achieve accurate symbol printing for a linear extrusion/tracing type of printing process, such as for a Fused Deposition Model (FDM) printer. Method 400 of FIG. 4 uses a symbology such as shown in FIG. 6B, which is optimized so as to achieve accurate symbol printing for a grid-based sequential layered area type of printing process, such as for a Digital Light Projection (DLP), Powder Deposition Printing (PDP), Jetting Liquid Polymer (JLP), Selective Laser Sintering (SLS) or Stereolithography (SLA) printer. The end result when using an FDM printing process is a 3D object 120 having a data matrix (such as 600 of FIG. 6A) embedded into a surface structure thereof. The end result when using a grid-based area type of printing process is a 3D object (such as 702 of FIG. 7) having a data matrix (such as 706 of FIG. 7) embedded into a surface structure thereof. As previously described, the embodiments described herein rely on the light reflective properties of differently shaped symbols formed by the material in the embedded data matrix to recover the data in a manner that it is relatively easy using conventional 2D image processing technology.

The method 200 starts at step 202 and proceeds to step 204, where the method 200 acquires data, such as barcode data, to be included as information with a 3-D object to be printed. The data can be acquired by any number of ways, such as, it can be included as a data file (metadata) along with the STL file of the 3D object. Alternatively, the data could be input manually by a user of the computer 102 during preparation for printing of the 3D object. One example of such data could be a name or title for the 3D object. Another example, used in the following exemplary description, is a URL, such as "www.google.com". Alternatively, the URL can point to a different internet site. In the present URL example, the data can be divided into 14 bytes of data, such as "|w|w|w|.|g|o|o|g|l|e|.|c|o|m|".

The method 200 proceeds to step 206, where the method 200 encodes the data into code words made up of symbols, using, for example, a subset of ISO/IEC 646 encoding (i.e., a 7-bit coded character set for information interchange). One example of such code words created using symbols (such as English letters and Arabic numerals), described in further detail below, is the following hexadecimal sequence: 0xe7, 0x3a, 0x38, 0xce, 0x63, 0xb0, 0x7f, 0x1c (note, in this example "0x" is simply a place holder, and the next two symbols are used for data representation). Hexadecimal data representation uses sixteen distinct symbols, in the illustrated example symbols 0-9 to represent values zero to nine, and symbols a, b, c, d, e, f to represent values ten to fifteen. The limited character subset of ISO/IEC 646 encoding is supported by nearly all computer systems available today. As previously described, encoding re-maps symbols in accordance with a pre-defined mapping, so as to facilitate reliable machine recovery of the data being conveyed (in the face of durability and recovery issues), or to increase the amount of information conveyed or to obscure the presentation of the data being conveyed, by the code. In order to increase the durability and reliability of the data encoded by the symbols arranged into a hexadecimal sequence, error correction may be employed as part of the coding process. One suitable known error correction coding technique is Reed-Solomon Error Correction Coding (RS-ECC). As is standard practice in RS-ECC, the method 200 estimates the percentage of space needed to incorporate the extra code symbols in accordance with the RS-ECC technique, by determining the number of code words which may contain an error or be concealed without it being detrimental to data recovery when scanning and reading the symbols. Reed-Solomon codes are especially well-suited to applications where recovery errors occur in a plurality of adjacent portions of a sequence, that is, in bursts. Reed-Solomon coding calculates complementary codes and add-in codes during the creation of the symbols. Reed-Solomon decoding regenerates the original coded data by recalculating the data from the complementary codes and add-in codes. The recalculation regenerates the original data by locating errors that occurred at the time of image scanning recovery of the code. Such errors may have been the result of 3D printing problems, specular reflection during the image scanning recovery of the code or degradation of the surface and volume of the 3D object in which the 3D code is embedded.

Continuing with the above example, before the 14 bytes of data (that is the information: "|w|w|w|.|g|o|o|g|l|e|.|c|o|m|".) can be converted into a barcode for association with a 3D object, additional data must prefix the data. A first prefix is used to indicate the packing method used for the data. For example, to indicate the known PDF417 packing method, the 14 bytes of data becomes the following 15 bytes: "|xE7|w|w|w|.|g|o|o|g|l|e|.|c|o|m|". A second prefix is used to indicate the length of the data, that is 14 bytes, thereby causing the data to now comprise the following 16 bytes: "|xE7|x0C|w|w|w|.|g|o|o|g|l|e|.|c|o|m|". Although disclosure of further details of the optional RS-ECC coding is beyond the scope of this specification, it is noted that 14 bytes of ECC CodePoints are needed for RS-ECC of 16 bytes of input data, as calculated by Galois Field Multiplication with a field generator polynomial. As well known, the ECC CodePoints can be considered as extra points in a coded sequence, so that if only a part of the coded sequence is recovered, the full sequence can still be regenerated using only the recovered codes.

Thus, continuing with the above example, 14+16=30 code words need to be included in the 3D barcode in order for the 3D barcode to incorporate Reed Solomon error correction techniques for the "|w|w|w|.|g|o|o|g|l|e|.|c|o|m|" data.

Given a grid size of M×N (columns and rows) in which to print the 30 code words of the 3D barcode, with K distinct values per symbol to be printed, establishes that:

$$\text{Number of bits stored} = M \times N \times \log_2(K)$$

$$\text{Number of codes stored } (n) = \tfrac{1}{8} \times M \times N \times \log_2(K)$$

For FDM symbology with K=4 (corresponding to the four arrangements of parallel lines shown in FIG. 6A or four arrangements of solid triangular objects shown in FIG. 7, described below), we can calculate the required size of the data matrix as:

$$\# \text{ of codes stored } (n) = \frac{\cancel{Æ\ ë\ Ç}}{8}$$

For M=16, N=8, the number of codes that can be stored is 32 codes, which will accommodate the above-noted requirement of 30 codes.

The actual number of rows (N) in the symbol matrix (so as to include one row each for an Orientation Bar and a Clock track, respectively, described below in conjunction with FIG. 6A) is N+2=10.

The actual number of columns in the symbol matrix (so as to include one column each for an Orientation Bar and a Clock track, respectively, described below in conjunction with FIG. 6A) is M+2=18.

Furthermore, in accordance with the optional Reed-Solomon error coding, the method 200 splits the n codes into (k) data codes and (n–k) error codes. With increasing value of n, the ratio of k/n will increase. This will allow correction up to (n–k)/2 erroneous symbols and (n–k) erasures. Thus, in the above example where M=16, N=8 and K=4, if the number of detected errors is does not exceed 7 or the number of unreadable symbols does not exceed 14, the original data can be recovered.

Continuing with the above example, the following hexadecimal sequence of code words is representative of the encoded data and ECC code words which collectively express "|xE7|x0C|w|w|w|.|g|o|o|g|l|e|.|c|o|m|":

0xe7,0x3a,0x38,0xce,0x63,0xb0,0x7f,0x1c,
0xb2,0x3f,0xda,0x69,0xc7,0x92,0x33,0xc7,
0x81,0x1c,0x11,0xfe,0xb8,0x7d,0x67,0x88,
0x80,0xa5,0xc7,0xeb,0xdb,0xc4,0x0c,0xcb A matrix of 10 rows by 18 columns is created having therein 2 rows and 2 columns for defining the orientation and bounding area for the symbol matrix, thereby leaving 8 rows by 16 columns for symbol placement, which symbols will be representative of the above-shown coded data sequence. Since only four symbols, representative of the numbers 0, 1, 2 and 3, are being used in the symbol matrix, the above hexadecimal coded sequence must be converted to a sequence able to be represented by base4 code words. A workflow for calculating the base4 code words to represent the byte sequence of the 32 hexadecimal code words shown above, is a follows:

```
Set NUM_COLUMNS = 16
Set NUM_ROWS = 8
For rowIndex in 2 to (MAX_ROWS – 1)
For columnIndex in 2 to (MAX_COL – 1)
-Set DataIndex = ((rowIndex – 2) * NUM_COLUMNS +
(columnIndex – 2)) * 2 + 1
-Matrix [rowIndex] [columnIndex].bit[0] = data[DataIndex /
8].bit[DataIndex % 8] –
Set DataIndex = DataIndex + 1
-Matrix [rowIndex] [columnIndex].bit[1] = data[DataIndex /
8].bit[DataIndex % 8]
End
```

As previously noted, the details for coding of the data to be conveyed by the barcode are incidental and optional to the embodiments described herein, and thus a detailed description of such coding is deemed not necessary for understanding the present invention. However the above workflow, in simple terms, picks the required number of bits from an input buffer stream of the hexadecimal data, and populates the symbol matrix in row major format. For example the first hexadecimal byte 0xe7 (where 0x is a place holder and the actual data is "e7") is equivalent to: (11–10–01–11) base 2=(3 2 1 3)base 4. We can consider that the above workflow converts the base256 (byte) input stream to a base4 output stream which is used to populate the symbol matrix. The conversion is done in little endian format (smaller end comes first in the matrix). The method proceeds to step 208.

At step 208 the method 200 determines printing instruction modifications that are required to be applied to a 3D printer using a particular printing technology in order to print the 3D object. Thus, the method 200 develops as an electronic file a set of instructions for printing the 3D object. Upon application of the printing instruction file to a 3D printer, the coded data becomes stored as a matrix of symbols (such as 620-626 of FIG. 6A), so as to comprise structure that is embedded into the surface of the 3D object, upon printing. Step 208 is optimized in accordance with method 300 of FIG. 3 and method 400 of FIG. 4, subsequently described, to achieve accurate symbol printing for a particular printing technology to be used to print the 3D object. Method 300 is optimized for a linear extrusion/tracing type of printing process, such as used by an FDM printer, while method 400 is optimized for a grid-based layered area type of printing process, such as used by a DLP, PDP, JLP or SLA printer.

The method 200 proceeds to step 210, where the method 200 provides the electronic file of modifications (set of instructions) determined by step 208 as layer by layer instructions for application to a 3D printer. Such instructions, when applied to a 3D printer, cause the 3D printer to print the 3D object, layer by layer, such that the symbol matrix of coded data becomes an embedded structural volume (such as matrix 706 depicted in FIG. 7), into the surface of the 3D object. The method 200 then proceeds to step 212 and ends.

Figure 3:
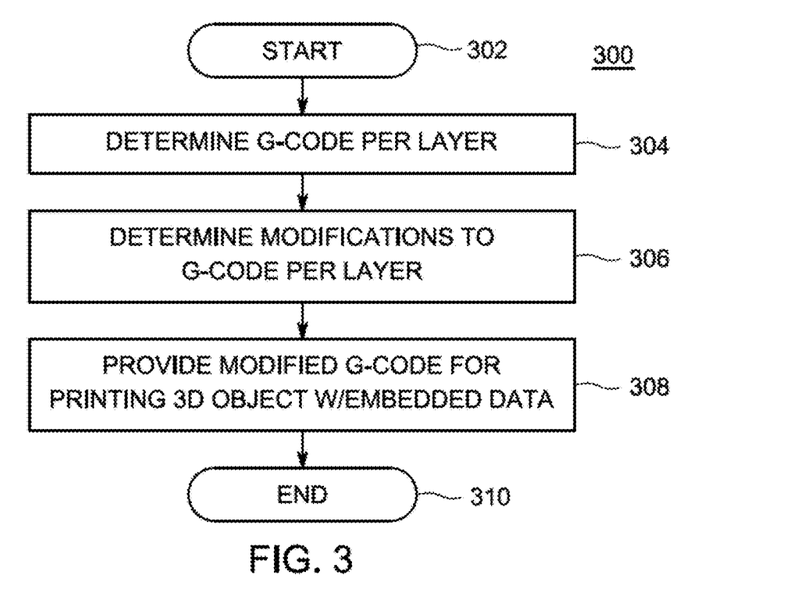
FIG. 3 depicts a flow diagram of a method for storing data embedded in the surface structure of a 3D printed object as performed by the data encoding processor and symbol embedding module of FIG. 1 for a first type of printing process, according to one or more embodiments.

FIG. 3 depicts a flow diagram of a method 300 for storing data embedded into the surface structure of a 3D printed object as performed by the data encoding processor 114 and symbol embedding module 116 of FIG. 1 for a first type of printing process, according to one or more embodiments. More specifically, method 300 embodies steps 208 and 210 of method 200 for an FDM type of printer. Method 300 starts at step 302 and proceeds to step 304.

At step 304, the method 300 initially processes an electronic file representative of the 3D object to be printed, in a manner similar to that provided by conventional 3-D printing software. That is, the method 300 develops and then slices a voxelized version a 3-D object, such as 702 of FIG. 7, into layers. As well known, 3-D printing software slices the STL file representative of the 3-D object into layers, which layers are then traced out by an extrusion head controlled by G-codes. G-codes are a set of codes that are standard in the industry for controlling movement of a cutting tool or print head. In the context of a 3D printer, the G-codes are applied as an electronic file to control the tracing pattern of the extrusion head, the speed of the extrusion head and whether or not the head is extruding material or not. The method 300 analyzes the .STL file, in a manner well known to those of ordinary skill in the art, to develop the G-codes that are applied as an electronic file to control the extrusion head for controllable printing of the 3D object.

The method 300 proceeds to step 306, where the method 300 determines layer by layer modifications to the G-codes, so that upon printing of the 3D object, the modified G-codes cause the printer to embed a symbol matrix such as matrix 600 of FIG. 6A, into the structure of the 3D object. The method 300 analyzes the .STL file to preferably find a flat surface on the 3D object that has at least the area of the symbol matrix. Specifically, the flat surface on the 3D object must be at least of a size to include the determined number of code words in the symbol matrix. For example, the size needed for the symbol matrix to hold the code as determined by step 206 above, may be 5 cm by 2.5 cm, by ½ cm deep. Thus, in this example, a flat surface on the 3D object must be found that is at least 5 cm by 2.5 cm or larger. The method 300 uses the previously developed printing instructions to determine modifications to be applied to the G-code. Step 306 applies the modifications to the G-code for each layer so as to develop a modified set of G-codes which when applied to an FDM printer, would cause the FDM printer to print the 3D object, layer by layer, such that the symbol matrix of coded data becomes an embedded structural volume (such as matrix 600 depicted in FIG. 6A), into the surface of the 3D object. Method 300 then proceeds to step 308.

At step 308 the method 300 provides the modifications determined by step 306 as layer by layer instructions for application to an FDM type of 3D printer. Such instructions, when applied to an FDM type of 3D printer, cause the 3D printer to print the 3D object, layer by layer, with the symbol matrix embedded therein. The method 300 then proceeds to step 310 and ends.

Figure 4:
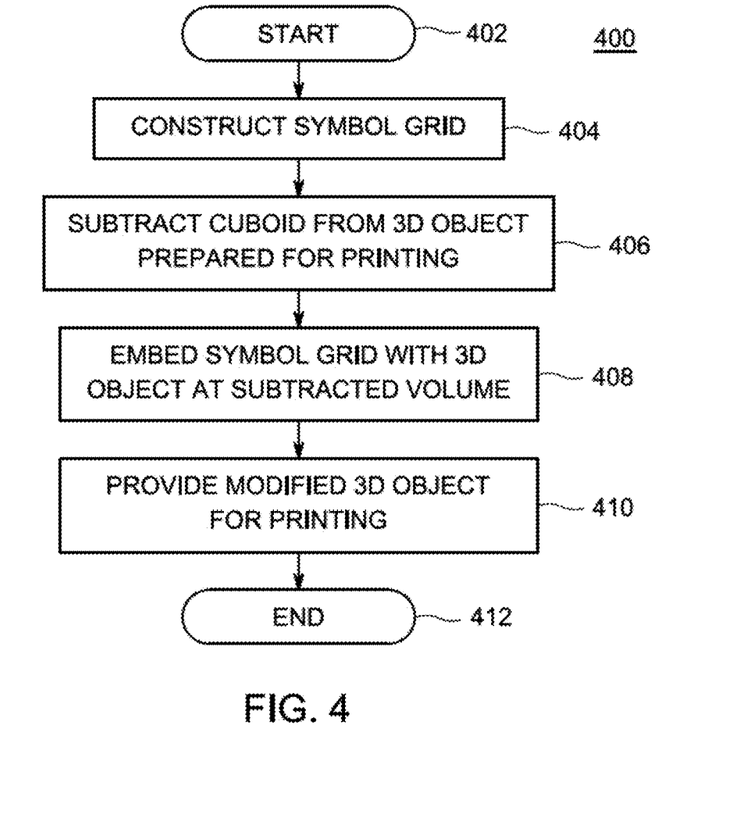
FIG. 4 depicts a flow diagram of a method for storing data embedded in the surface structure of a 3D printed object as performed by the data encoding processor and symbol embedding module of FIG. 1 for a second type of printing process, according to one or more embodiments.

FIG. 4 depicts a flow diagram of a method 400 for storing data embedded into the surface of a 3D printed object as performed by the data encoding processor 114 and symbol embedding module 116 of FIG. 1 for a second type of printing process, according to one or more embodiments. More specifically, a second type of printing process may be of the SLS/DLP/PDP/SLA type. Method 400 constructs a symbol grid, subtracts a volume from the 3D object that corresponds to the volume of the symbol grid, performs a Boolean union operation that embeds the volume of the symbol grid with the volume subtracted, and then develops printing instructions that cause the layer by layer printing of the 3D object in a manner such that the symbol grid becomes an embedded structural volume therein. The method 400 starts at step 402 and proceeds to step 404.

At step 404, the method 400 develops a symbol matrix such as matrix 706 of FIG. 7, so as to represent the coded data 118. Details for the construction of a suitable symbol matrix is described below in conjunction with the description of FIG. 6B and FIG. 7. Method 400 then proceeds to step 406.

Step 406 can be performed before, after or simultaneously with step 404. At step 406, the method 400 receives and processes a .STL file representative of the surface of a 3-D object to be printed using well known 3-D printing software, into a voxel grid representation of the 3D object. That is, the .STL file is converted into solid representation composed of voxels. The method 400 analyzes the voxel grid representation of the 3D object to preferably find a flat surface on the 3D object that has at least the volume need to form the symbol matrix. Specifically, the flat surface on the 3D object must be at least of the size of the symbol matrix and the depth of the symbol matrix. For example, the size needed for the symbol matrix to hold the code may be 5 cm by 2.5 cm by ½ cm deep. Thus, in this example, a flat surface on the 3D object must be found that is at least 5 cm by 2.5 cm or larger. The method 400 subtracts from a flat surface found in the voxel grid representation of the 3D object, preferably on a bottom surface of the 3D object, a cuboid volume that extends into the 3D object and which corresponds to the volume required to print the symbol matrix. The method 400 then proceeds to step 408.

At step 408, the method 400 performs a Boolean union operation that embeds the volume of the symbol matrix with the cuboid volume removed from the voxel grid representation of the 3D object by operation of step 406. Thus, the coded print matrix becomes embedded in the bottom surface of the voxel grid representation of the 3D object. Method 400 then proceeds to step 410.

At step 410, the method 400 provides the voxel grid representation of the 3D object having the coded symbol matrix embedded therein, to a DLP, PDP or SLA type 3D printer, for printing the 3D object. The method 400 proceeds to step 412 and ends.

Figure 5:
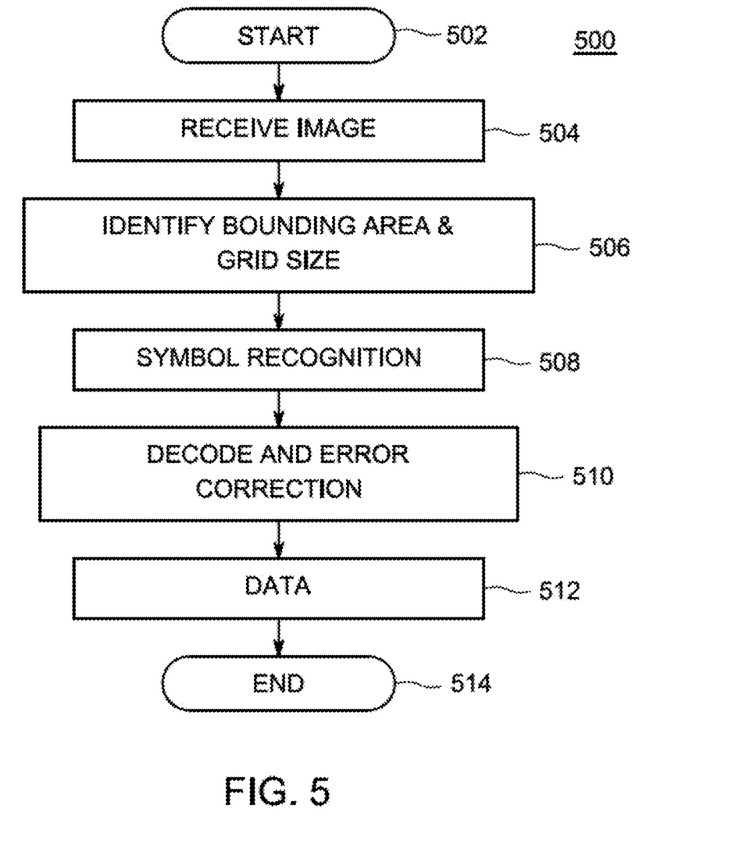
FIG. 5 depicts a flow diagram of a method for retrieving data embedded in a surface structure of a 3D object as performed by the image processing module and the data decoding and error correction module of FIG. 1, according to one or more embodiments.

FIG. 5 is a flow diagram of a method 500 for retrieving coded data printed in a surface of a 3D object as performed by the image processing module 124 and the data decoding and error correction module 126 of FIG. 1, according to one or more embodiments. The method 500 starts at step 502 and proceeds to step 504. At step 504, the method 500 receives an image, for example a photograph of the surface of a 3D object having a coded symbol matrix embedded therein. If it is not known in which part of the 3D object the coded symbol matrix is embedded, multiple images can be received of the 3-D object from various angles in order that all images can be analyzed using the following method so as to recover the coded data. Typically, however it is known where the coded data is embedded, such as on a bottom surface 708 of the 3-D object 702 of FIG. 7. Thus, at step 504 a photograph taken, for example, using a cell phone camera, is received as an image which has captured the coded symbols.

The method 500 proceeds to step 506, where the method 500 uses conventional edge detection, previously described, to enhance the image so as to find the orientation bars and clock tracks. As noted above, the orientation bars and clock tracks include a predefined pattern of symbols therein that identify the location (orientation and extent) of the bounding area of the symbol matrix and the grid size that divides the bounding area into the sub-regions, which sub-regions identify the matrix portions that include respective ones of the coded symbols. Further description of the orientation bars and clock tracks is provided below in conjunction with FIG. 6A.

The method 500 proceeds to step 508, where the method 500 analyzes the edge detected image in each sub-region of the bounding area using standard image recognition techniques, such as pattern matching, in order to recover the symbols representative of the coded data. As noted above, the symbols may be four unique image patterns, such as four different spatial orientations of parallel lines or four different spatial orientations of a given geometric shape, where each different spatial orientation is representative of a value of 0, 1, 2 or 3, so as to provide 2 bits of information for each symbol.

The method 500 proceeds to step 510, where the method 500 decodes the recovered symbols using standard decoding techniques, such as a look up table. If Reed-Solomon error correction coding was applied, the recovered symbols include encoded data and ECC code words. The method 500 then uses Reed-Solomon error correction decoding in order to determine the original encoded data by recalculating the recovered data. The original data is determined from complementary codes and the ECC code words added during the encoding process, described above with respect to step 206 of method 200. A recalculation of the recovered data regenerates the original data by locating any errors. Such errors may be the result of problems during 3-D printing, specular reflection during the image generation process or degradation of the coded symbols embedded in the printed volume. Although the details of Reed-Solomon decoding are beyond the scope of this disclosure and providing them herein would unnecessarily obscure the disclosure, those skilled in this art will recognize that the standard and well know Peterson Decoder can be used to decode the recovered code words into the original data as long as, in the above example where M=16, N=8 and K=4, the number of detected errors is does not exceed 7 or the number of unreadable symbols does not exceed 14.

The method 500 proceeds to step 512, where the method 500 provides the regenerated original data, for example to a display, where a user can view the information conveyed by the data. The method 500 then proceeds to step 514 and ends.

FIGS. 6A and 6B together illustrate construction of a symbol matrix 600 as performed by the symbol embedding module 116 of FIG. 1, according to one or more embodiments. In the FIG. 6A embodiment, a symbology 601 is used which is optimized for FDM type printing. In symbology 601 four different arrangements of parallel lines (or ridges) are representative of easily identified symbols. A symbol comprising an arrangement of left to right downward diagonal parallel lines corresponds to a numerical 0. A symbol comprising an arrangement of right to left downward diagonal parallel lines corresponds to a numerical 1. A symbol comprising an arrangement of horizontal parallel lines corresponds to a numerical 2. A symbol comprising an arrangement of vertical parallel lines corresponds to a numerical 3. In the FIG. 6B embodiment, an alternative symbology is shown optimized for non-FDM printers, where each of the symbols can be represented by a predetermined orientation angle of a slanted surface, such as slanted surface 630, as described in greater detail below in conjunction with the description of FIG. 7.

As previously described, the size needed for the symbol matrix to hold the code (as determined by step 206 of method 200), may be 10 rows by 18 columns. Based on the size of the flat surface on the 3D mode, this matrix may be determined to easily fit into an area of 5 cm by 2.5 cm by ½ cm deep. In order to advantageously provide for simple image recognition techniques to be used to easily identify the orientation, shape and size of the symbol matrix 600, L-shaped orientation bars 602 and 604 are provided. Orientation bars 602 and 604 are formed into an L-shaped bound defining a square or rectangular shape. Each bar includes a predefined arrangement of symbols which enhance their detection when the aforementioned image processing edge detection techniques are used. In the FIG. 6A illustrated embodiment an arrangement of three parallel lines 603 is used in orientation bar 602 and an arrangement of three parallel lines 605 is used in orientation bar 604. The extent of the parallel lines 603 and 605 indicates the x-y size (area) of the matrix 600.

Opposing L-shaped sides 606 and 608 of the L-shaped bound are clock track bars, and include an arrangement of parallel lines, such as 610 and 612, arranged in a repeating pattern as symbols along their length. The length of each symbol along each of the opposing L-shaped sides corresponds to a unit of measurement. In the illustrated embodiment, adjacent symbols 610 and 612 each identify a length of respective sub-regions 614 and 616. The length of additional sub-regions along sides 606 and 608 are identified by additional symbols formed adjacent to symbols 610 and 612, forming a repeating measurement pattern along sides 606 and 608, hence the term "clock track" for the sides 606 and 608. Although only a few of symbols 610 and 612 are shown so as to not obscure the drawing, in practice such symbols are repeated along the full length of sides 606 and 608 so as to identify the length of sub-regions within the symbol matrix 600. Thus, when the identified lengths of the sub-regions are extended in a parallel pattern across the x-y area of the bounded area including symbol matrix 600, they divide the bounded area into an identified grid of sub-regions 618. Within each sub-region 618 a symbol is printed using the material and manufacturing process used to print the 3-D object. For an FDM type printer, in one embodiment noted above, the symbols used in the symbol matrix are respective ones of four possible arrangements of parallel lines 601 shown in FIG. 6A. For non-FDM type printers, in another embodiment, the symbols used in the symbol matrix are respective ones of four possible angles of a slanted surface 630 shown in FIG. 6B.

As noted above, in the FIG. 6A embodiment the symbols comprise four different arrangements of parallel lines, and more specifically, a right to left arrangement 620, a left to right arrangement 622, a horizontal arrangement 624 and a vertical arrangement 626. Although, the FDM print head cannot represent data at each layer as compactly as a DLP/PDP/SLA type printer, the extrusion head has very high precision of motion while tracing parallel lines. Thus, each one arrangement of the parallel lines defines one symbol included in the symbol matrix 600. Each symbol can create with high precision two bits of data by using the 4 simple patterns 620-626 of parallel lines.

The alternative embodiment illustrated by FIG. 6B is optimized for a DLP/PDP/SLA type printer, where the material used to form the 3D object is arranged so as to form a slanted surface within each sub-region 618 of the matrix 600. The slanted surface acts as a symbol. In one embodiment, the symbol in each sub-region has a given orientation of the slant angle of a plurality of possible orientations. Each symbol can be arranged along the orientation bars, clock track bars and in the sub-regions 618. A slanted surface is particularly well-suited for forming a symbol for image recognition, since depending on an orientation angle of the slanted surface 630, a different amount of light will be reflected from the material forming the surface 630, and thereby vary the brightness of that sub-region in the matrix 600. In the illustrated embodiment the symbology includes four solid right isosceles triangles 632, 634, 636 and 638, each one orientated so as to be rotated 90 degrees around a central vertical axis from one another. Each particular orientation of the four triangles is used to convey a respective one of four numeric values, such as 0, 1, 2 and 3. The different orientations of the slanted surface 630 for each of triangles 632, 634, 636 and 638 causes a different level of reflectivity in that respective portion of the sub-region of the matrix. Such sub-regions of different reflectivity are easily detected by the image processing module 124 of FIG. 1, thereby providing for relatively easy symbol recognition and data recovery using the previously described method 500.

Although in the illustrated embodiments the data matrix is embedded into a flat surface of the 3D object, non-flat surfaces can also be used, although they would not be optimal. For example if a curved surface were used, geometric transformations would be required to adjust a recovered 2D image of the data codes in order to obtain the original geometry of the printed symbols. As well known to those skilled in processing geometric images, such transformation may comprise rotation, translation, scaling, mapping, etc., collectively more generally known as affine transformations, which transfer shapes from one type of Euclidean space to another.

The disclosed 3D printed data store technology has significant advantages over 2D barcodes as specified above in terms of data storage capacity, durability and security (protection from malicious intent).

Steganography advantages: 2D pasted barcodes are intrusive. They hide the content and surface underneath. A 3D printed data storage for FDM printers can be added into the top layers of any flat surface of a 3D object with minimum perceptible change to the overall structure of the 3D object. The only change required for a FDM based 3D print would be in the sliced G-code used to form the top layers.

Data storage capacity advantages: Due to the fact that the embodiments described herein can use a majority of the 3D object surface for storing data (such as the entire bottom of the base of the object, a much larger region in which to include the data is provided, as compared with an intrusive 2D barcode label. In addition, due to the high accuracy of FDM printer's ability to print parallel lines, a small enough symbol size can be easily printed which will allow a very high density of data storage.

Durability advantages: Since the 3D data will be stored as part of the surface structure of the 3D object itself during the 3D printing process, instead of being pasted on to the 3D object later on, the data will not be able to be removed as easily as a pasted label barcode, which can be easily removed or destroyed when splashed with a liquid. In addition, over an entire lifetime of wear and tear on the 3D object, the 3D object typically suffers minimal loss of volume below its surface, thereby ensuring durability of 3D data which is embedded into the 3D object. Even furthermore, by use of Reed Solomon Error Correction code techniques, recovery from (n−k)/2 erroneous symbols and (n−k) erasures is possible. For typical ratios of n and k, this will allow for recovery from up to 20% erroneously recovered symbols and 40% erasures over a lifetime of surface degeneration.

Security (protection from malicious intent) advantages: Since the coded data is stored as an embedded volume, it cannot be easily removed/scraped/changed without noticeable change in surface geometry and texture of the 3D object, thereby allowing for storing data on the surface, such as a hidden watermark. A pasted barcode can be removed much more easily.

The present embodiments can be used for authoring 3D objects which have datacodes embedded in their surface for storing data, such as for identifying a part number and storing other data such as:

Batch number
URL
Watermark
Production date
Package date
Serial number
Weight (kgs/pounds)
Price
UPS Code The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as JAVA®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method to retrieve data embedded as structure in the surface of 3D objects, comprising:
    obtaining a 2D image of at least a portion of a 3D object having symbols embedded as structure in the surface thereof;
    identifying an orientation and dimension of an area of the 3D object that includes the embedded symbols based on the 2D image;
    identifying sub-regions of the area of the 3D object;
    detecting, in the identified sub-regions of the identified area of the 3D object:
        a first group of symbols, wherein each symbol of the first group of symbols comprises parallel lines having an orientation; and
        a second group of symbols, wherein each symbol of the second group of symbols comprises a slanted surface having an orientation; and
    decoding the detected first group of symbols and the second group of symbols to retrieve data from the first group of symbols and the second group of symbols based on the orientations of the parallel lines and the orientations of the slanted surfaces.

2. The method of claim 1, wherein detecting the first group of symbols comprises detecting parallel lines having a right-to-left slanted orientation, a left-to-right slanted orientation, a horizontal orientation, or a vertical orientation.

3. The method of claim 1, wherein detecting the first group of symbols and the second group of symbols comprises detecting light reflectivity of a material of the 3D object.

4. The method of claim 1, wherein identifying the orientation and dimension of the area comprises identifying a first pair of joined L-shaped bars as a perpendicular arrangement of two groups of parallel lines, an extent of each group of parallel lines defining a length dimension of the area.

5. The method of claim 4, wherein identifying sub-regions of the area of the 3D object comprises identifying a second pair of L-shaped bars as a repeating pattern of symbols, a dimension of each symbol in the repeating pattern defining a dimension of a sub-region of the area.

6. The method of claim 5, wherein the repeating pattern of symbols comprises two adjacent embedded symbols, each symbol having a different orientation of a plurality of possible orientations.

7. The method of claim 1, wherein detecting the first group and the second group of symbols in the identified sub-regions comprises detecting:
the first group of symbols within a first sub-region of the area; and
the second group of symbols within a second sub-region of the area.

8. A printed 3D object comprising:
a surface having structurally embedded therein during printing, a volume corresponding to a 3D symbol matrix comprising an arrangement of symbols representative of data, wherein the arrangement of symbols comprise:
a first group of symbols, wherein each symbol of the first group of symbols comprises parallel lines having a unique orientation encoding data; and
a second group of symbols, wherein each symbol of the second group of symbols comprises a slanted surface having a unique orientation encoding data.

9. The 3D object of claim 8, wherein the parallel lines of each symbol of the first group of symbols comprises one or more of a right-to-left slanted orientation, a left-to-right slanted orientation, a horizontal orientation, or a vertical orientation.

10. The 3D object of claim 8, wherein:
the 3D symbol matrix presents at the surface of the 3D object, an area identifiable by indicia that define an orientation and dimension of the area of the 3D symbol matrix embedded in the 3D object; and
indicia that define sub-regions of the area, where the symbols representative of the data are printed in the sub-regions.

11. The 3D object of claim 10, wherein the symbol in each sub-region causes a predetermined pattern of light reflectivity by a material of the 3D object in the area of the sub-region.

12. The 3D object of claim 11, wherein the indicia that define the orientation and the dimension of the area comprise a pair of joined L-shaped bars, each bar comprising a uniform arrangement of adjacently positioned symbols, an extent adjacently positioned symbols defining a length dimension of the area.

13. The 3D object of claim 11, wherein the indicia that define sub-regions of the area comprise a pair of L-shaped bars, each bar comprising a repeating pattern of symbols, a dimension of each symbol in the repeating pattern defining a dimension of a sub-region of the area.

14. A system for retrieving data embedded as structure in the surfaces of 3D objects, comprising:
at least one processor; and
at least one non-transitory computer readable storage medium storing instructions that, when executed by the at least one processor, cause the system to:
obtain a 2D image of at least a portion of a 3D object having symbols embedded as structure in the surface thereof;
identify an orientation and dimension of an area of the 3D object that includes the embedded symbols based on the 2D image;
identify sub-regions of the area of the 3D object;
detect, in the identified sub-regions of the identified area of the 3D object:
a first group of symbols, wherein each symbol of the first group of symbols comprises parallel lines having a unique orientation; and
a second group of symbols, wherein each symbol of the second group of symbols comprises a slanted surface having a unique orientation; and
decode the detected first group of symbols and the second group of symbols to retrieve data from the first group of symbols and the second group of symbols based on the orientations of the parallel lines and the orientations of the slanted surfaces.

15. The system of claim 14, wherein the instructions, when executed by the at least one processor, cause the system to process the 2D image to detect a right-to-left slanted orientation, a left-to-right slanted orientation, a horizontal orientation, or a vertical orientation of each parallel line.

16. The system of claim 14, wherein the instructions, when executed by the at least one processor, cause the system to detect the first group of symbols and the second group of symbols by detecting light reflectivity of a material of the 3D object.

17. The system of claim 14, wherein the instructions, when executed by the at least one processor, cause the system to identify the orientation and dimension of the area by performing one or more steps comprising identifying a first pair of joined L-shaped bars as a perpendicular arrangement of two groups of parallel lines, an extent of each group of parallel lines defining a length dimension of the area.

18. The system of claim 17, wherein the instructions, when executed by the at least one processor, cause the system to identify sub-regions of the area of the 3D object by performing one or more steps comprising identifying a second pair of L-shaped bars as a repeating pattern of symbols, a dimension of each symbol in the repeating pattern defining a dimension of a sub-region of the area.

19. The system of claim 18, where the repeating pattern of symbols comprises two adjacent embedded symbols, each symbol having a different one orientation of a plurality of possible orientations.

20. The system of claim 18, wherein the instructions, when executed by the at least one processor, cause the system to detect the first group and the second group of symbols in the identified sub-regions by detecting:
the first group of symbols within a first sub-region of the area; and the second group of symbols within a second sub-region of the area.

\* \* \* \* \*